(12) United States Patent  (10) Patent No.: US 8,799,629 B2
Yildiz et al.  (45) Date of Patent: Aug. 5, 2014

(54) PARALLEL EXECUTION OF A LOOP

(75) Inventors: Huseyin S. Yildiz, Kenmore, WA (US);
Stephen S. Toub, Seattle, WA (US);
Paul Ringseth, Bellevue, WA (US);
John Duffy, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1115 days.

(21) Appl. No.: 12/328,262

(22) Filed: Dec. 4, 2008

(65) Prior Publication Data

US 2010/0146245 A1  Jun. 10, 2010

(51) Int. Cl.
*G06F 9/30* (2006.01)
*G06F 9/50* (2006.01)

(52) U.S. Cl.
CPC .................... *G06F 9/5027* (2013.01)
USPC ........................... 712/241; 717/150

(58) Field of Classification Search
None
See application file for complete search history.

(56) References Cited

U.S. PATENT DOCUMENTS

| | | | |
|---|---|---|---|
| 5,151,991 | A | 9/1992 | Iwasawa et al. |
| 5,586,320 | A | 12/1996 | Hotta et al. |
| 6,212,617 | B1 | 4/2001 | Hardwick |
| 6,292,822 | B1 | 9/2001 | Hardwick |
| 7,146,365 | B2 | 12/2006 | Allen et al. |
| 2005/0050374 | A1 | 3/2005 | Nakamura et al. |
| 2005/0131977 | A1* | 6/2005 | Bera .............................. 708/446 |
| 2007/0022422 | A1 | 1/2007 | Tirumalai et al. |
| 2007/0234326 | A1 | 10/2007 | Kejariwal et al. |

OTHER PUBLICATIONS

Tzen et al.; "Dependence Uniformization: A Loop Parallelization Technique"; May 1993; IEEE Transactions on Parallel and Districuted Systems; vol. 4 No. 5, pp. 547-558.*
Amy W. Lim, Monica S. Lam, Maximizing parallelism and minimizing synchronization with affine partitions, Parallel Computing, vol. 24, Issues 3-4, May 1998, pp. 445-475.*
Manohar K. Prabhu and Kunle Olukotun. 2003. Using thread-level speculation to simplify manual parallelization. In Proceedings of the ninth ACM SIGPLAN symposium on Principles and practice of parallel programming (PPoPP '03). ACM, New York, NY, USA, 1-12.*
Kunle Olukotun, Lance Hammond, and Mark Willey. 1999. Improving the performance of speculatively parallel applications on the Hydra CMP. In Proceedings of the 13th international conference on Supercomputing (ICS '99). ACM, New York, NY, USA, 21-30.*
Prabhu, et al., "Exposing Speculative Thread Parallelism in SPEC2000", Retrieved at <<http://ogun.stanford.edu/~kunle/publications/hydra__PPoPP05.pdf>>, PPoPP'05, Jun. 15-17, 2005, Chicago, Illinois, USA, pp. 11.

(Continued)

*Primary Examiner* — William B Partridge
(74) *Attorney, Agent, or Firm* — Kevin Sullivan; Brian Haslam; Micky Minhas

(57) ABSTRACT

A method of executing a loop over an integer index range of indices in a parallel manner includes assigning a plurality of index subsets of the integer index range to a corresponding plurality of threads, and defining for each index subset a start point of the index subset, an end point of the index subset, and a boundary point of the index subset positioned between the start point and the end point of the index subset. A portion of the index subset between the start point and the boundary point represents a private range and the portion of the index subset between the boundary point and the end point represents a public range. Loop code is executed by each thread based on the index subset of the integer index range assigned to the thread.

20 Claims, 4 Drawing Sheets

(56) References Cited

OTHER PUBLICATIONS

Han, et al., "Reducing Synchronization Overhead for Compiler-Parallelized Codes on Software DSMs", Retrieved at <<http://arcs.kaist.ac.kr/papers/springer97.pdf>>, pp. 6.

Hadjidoukas, et al., "Integrating MPI and Nanothreads Programming Model", Retrieved at <<http://ieeexplore.ieee.org/iel5/7804/21448/00994297.pdf?tp=&arnumber=994297&isnumber=21448>>, IEEE 2002, pp. 8.

* cited by examiner

PARALLEL EXECUTION OF A LOOP

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Parallelization of loop based workloads is a technique commonly used to better utilize available hardware resources and to speed up processing. The efficiency of such parallelization greatly depends on the way loop ranges get partitioned across processors, and the workload characteristics (e.g., how the cost of processing iterations varies across the index range, and how much thread blocking is involved).

In one embodiment, a loop is executed over an integer index range of indices in a parallel manner. Index subsets of the integer index range are assigned to threads. For each index subset, a start point of the index subset, an end point of the index subset, and a boundary point of the index subset positioned between the start point and the end point of the index subset, are defined. The portion of the index subset between the start point and the boundary point represents a private range and the portion of the index subset between the boundary point and the end point represents a public range. Loop code is executed by each thread based on the index subset of the integer index range assigned to the thread.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
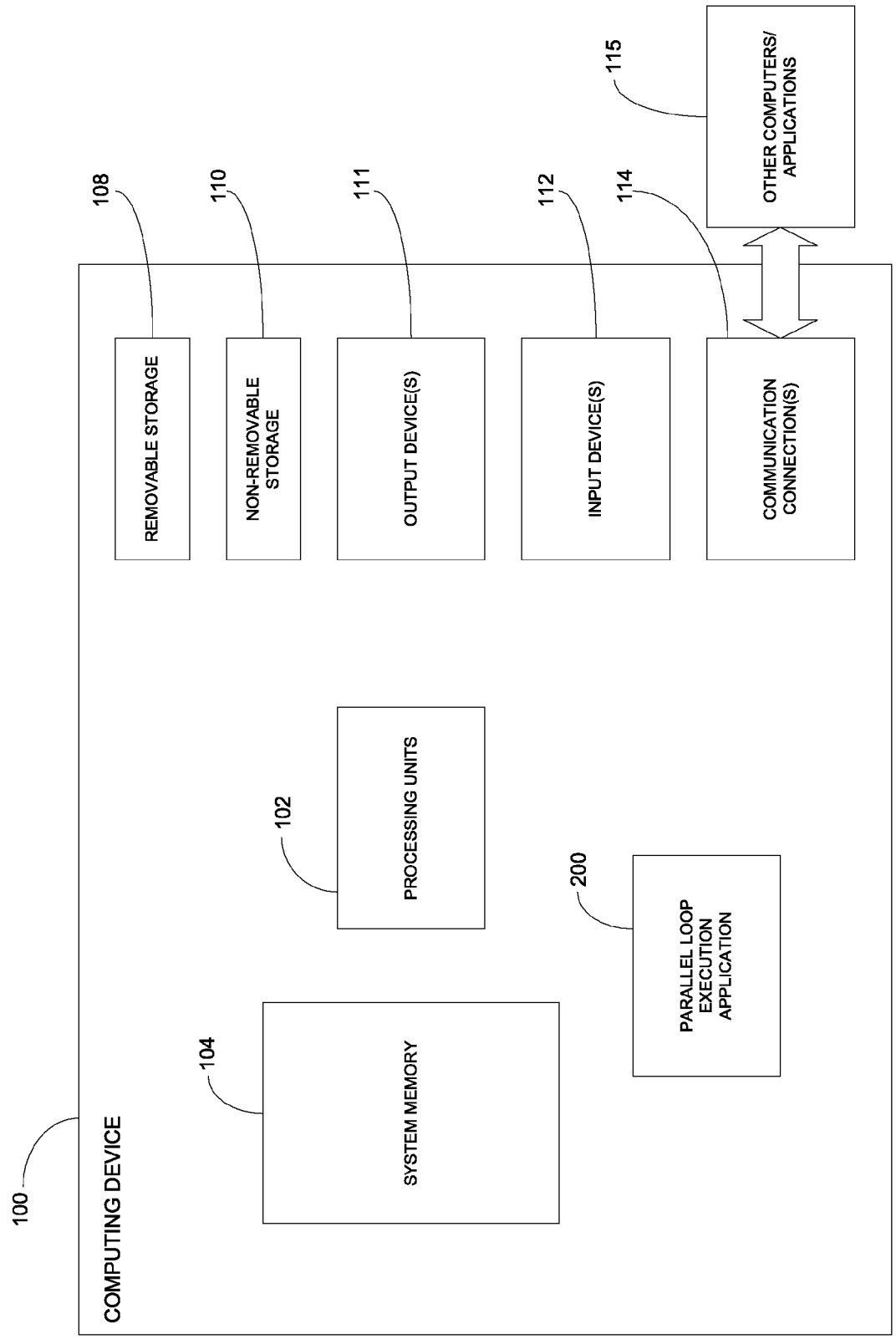
FIG. 1 is a diagram illustrating a computing system suitable for performing a parallel execution of a loop according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that executes a loop over an integer index range of indices in a parallel manner using blocking detection and dynamic range splitting, but the technologies and techniques described herein also serve other purposes in addition to these. In one implementation, one or more of the techniques described herein can be implemented as features within a framework program such as MICROSOFT® .NET Framework, or within any other type of program or service.

Data parallel systems typically operate by partitioning input data into disjoint subsets (partitions) so that independent tasks of execution may process the separate subsets in isolation. The partitions are processed in parallel by multiple processors to generate a plurality of output sets. The output sets are merged back into a merged output set.

One issue that arises in a data parallel system is the execution of a parallel loop. One embodiment provides efficient parallel execution of loops over integer index ranges on multiple processors. When multiple threads work on the same range of integer indices in one embodiment, the range of indices is initially divided up into index subsets that are assigned to different processors or threads so that no two threads work on the same index. For example, in a system with four processors or threads, and a range of 100 integer indices, in one embodiment, the first 25 indices would initially be assigned to the first thread, the second 25 indices would be initially assigned to the second thread, the third 25 indices would be initially assigned to the third thread, and the fourth 25 indices would be initially assigned to the fourth thread. Thread synchronization operations are performed in one embodiment to cause the entire range of indices to be processed in an efficient manner.

Parallelization of loop based workloads is a technique commonly used to better utilize available hardware resources and to speed up processing. The efficiency of such parallelization greatly depends on the way loop ranges get partitioned across processors, and the workload characteristics (e.g., how the cost of processing iterations varies across the index range, and how much thread blocking is involved.) The following are some of the general difficulties and tradeoffs associated with the efficient parallel execution of loops. Speed up and scaling on multiple processors are made possible by the following: (1) Good load balancing (i.e., close to full utilization of available processing power during the entire execution of the loop); (2) low synchronization overheads across processors; and (3) data locality on individual processors. Finer grained partitioning improves load balancing, but at the same time increases synchronization overheads, and in some cases degrades data locality. Coarse grained partitioning reduces synchronization overheads, and improves data locality, but it can degrade load balancing.

While it is usually possible to strike a good balance between synchronization costs and load balancing for a specific workload by picking a suitable partitioning scheme (e.g. fixed, increasing, or decreasing partitioning parameters), this involves knowledge of the workload's characteristics beforehand, which is not always possible in a general purpose parallel execution Application Programming Interface (API). In addition, blocking code in the loop iterations can cause some of the processors to wait on external events, while still holding on to the index ranges reserved for those processors. This effectively degrades load balancing, since it is a lost opportunity in terms of redistributing work to other processors. One embodiment provides a dynamic range partitioning scheme that addresses the above-identified issues and is adaptable to different workload characteristics.

FIG. 1 is a diagram illustrating a multi-processor computing device 100 suitable for performing a parallel execution of a loop according to one embodiment. In the illustrated embodiment, the computing system or computing device 100 includes a plurality of processing units (e.g., processors) 102 and system memory 104. Depending on the exact configuration and type of computing device, memory 104 may be volatile (such as Random Access Memory RAM)), non-volatile (such as Read Only Memory (ROM), flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, Electrically Erasable Programmable ROM (EEPROM), flash memory or other memory technology, Compact Disc ROM (CD-ROM), digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes parallel loop execution application 200. Parallel loop execution application 200 is described in further detail below with reference to FIG. 2.

Figure 2:
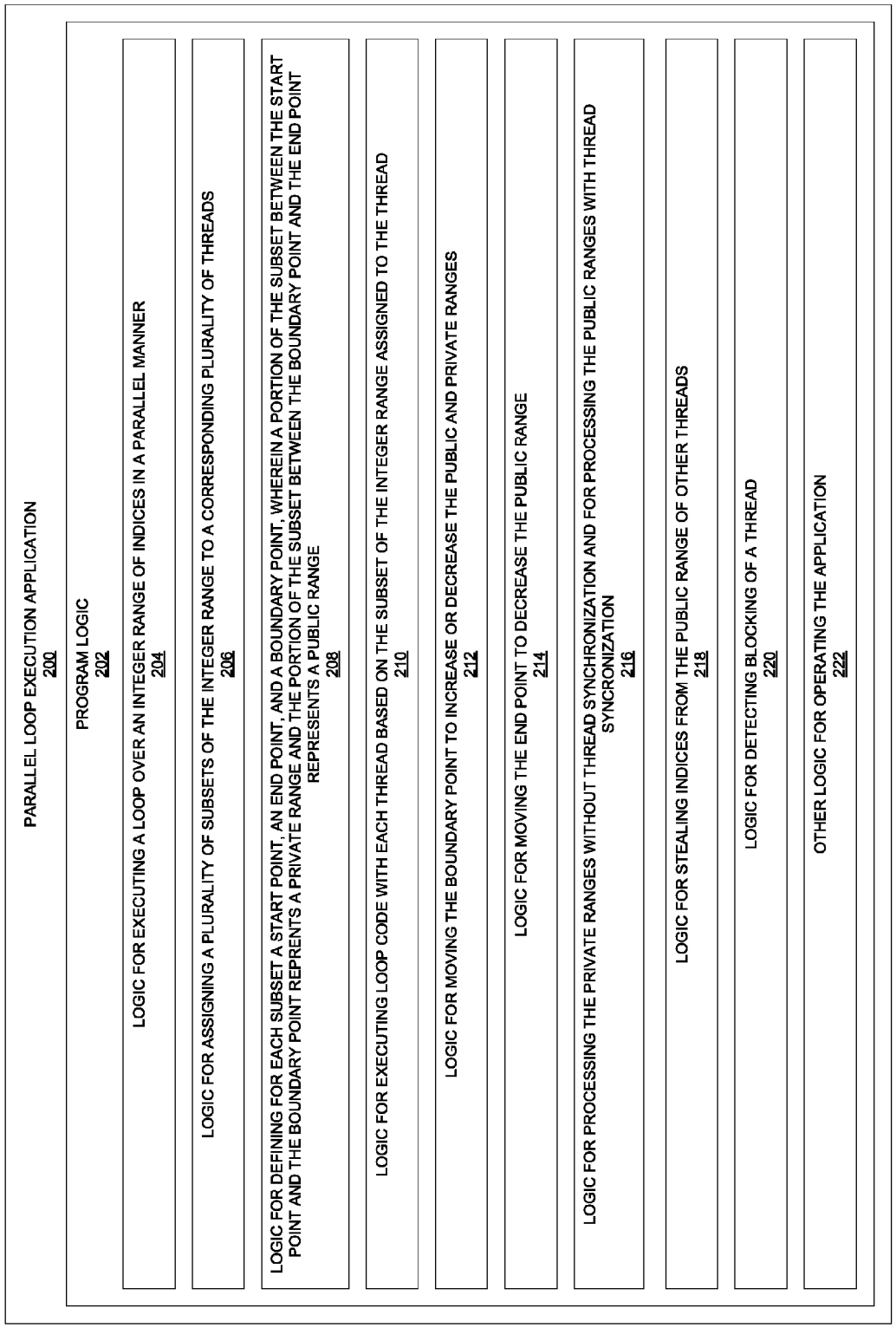
FIG. 2 is a diagrammatic view of a parallel loop execution application for operation on the computer system illustrated in FIG. 1 according to one embodiment.

FIG. 2 is a diagrammatic view of one embodiment of a parallel loop execution application 200 for operation on the computing device 100 illustrated in FIG. 1. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Parallel loop execution application 200 includes program logic 202, which is responsible for carrying out some or all of the techniques described herein. Program logic 202 includes logic 204 for executing a loop over an integer index range of indices in a parallel manner; logic 206 for assigning a plurality of index subsets of the integer index range to a corresponding plurality of threads; logic 208 for defining for each index subset a start point of the index subset, an end point of the index subset, and a boundary point of the index subset positioned between the start point and the end point of the index subset, wherein a portion of the index subset between the start point and the boundary point represents a private range and the portion of the index subset between the boundary point and the end point represents a public range; logic 210 for executing loop code with each thread based on the index subset of the integer index range assigned to the thread; logic 212 for moving the boundary point to increase or decrease the public and private ranges; logic 214 for moving the end point to decrease the public range; logic 216 for processing the private ranges without thread synchronization and for processing the public ranges with thread synchronization; logic 218 for stealing indices from the public range of other threads; logic 220 for detecting blocking of a thread; and other logic 222 for operating the application.

Figure 3:
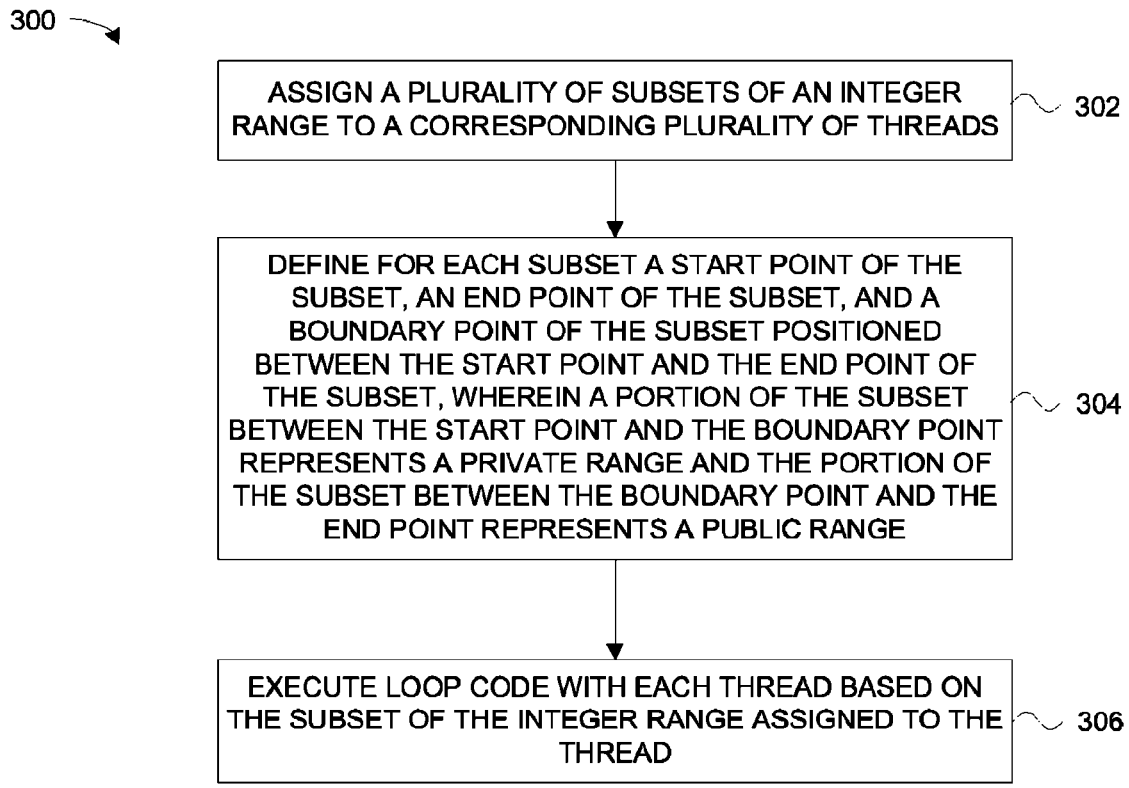
FIG. 3 is a flow diagram illustrating a method for executing a loop over an integer index range of indices in a parallel manner according to one embodiment.
Figure 4:
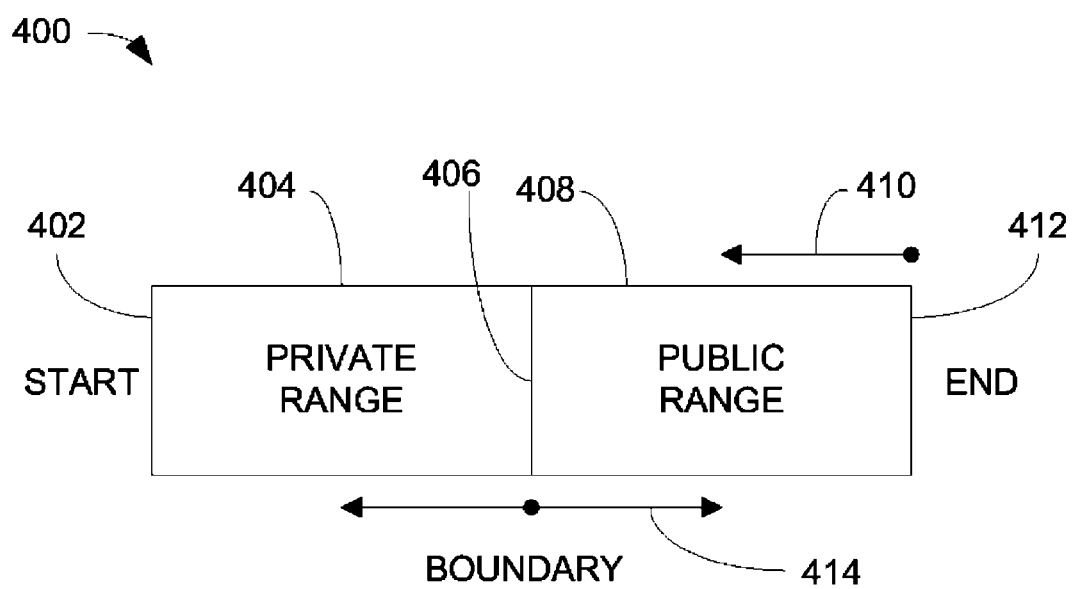
FIG. 4 is a diagram illustrating an index subset of an integer index range for parallel loop execution by a thread according to one embodiment.

Turning now to FIGS. 3 and 4, techniques for implementing one or more embodiments of parallel loop execution application 200 are described in further detail. In some implementations, the techniques illustrated in FIGS. 3 and 4 are at least partially implemented in the operating logic of computing device 100.

FIG. 3 is a flow diagram illustrating a method 300 for executing a loop over an integer index range of indices in a parallel manner according to one embodiment. At 302 in method 300, a plurality of index subsets of the integer index range are assigned to a corresponding plurality of threads. At 304, for each index subset, a start point of the index subset, an end point of the index subset, and a boundary point of the index subset positioned between the start point and the end point of the index subset are defined, wherein a portion of the index subset between the start point and the boundary point represents a private range and the portion of the index subset between the boundary point and the end point represents a public range. At 306, loop code is executed with each thread based on the index subset of the integer index range assigned to the thread.

In one embodiment of method 300, the private range of an index subset assigned to a thread represents a range of indices that are to be processed by the thread without synchronization with other threads, and the public range of an index subset assigned to a thread represents a range of indices that are configured to be processed by any one of the threads based on synchronization with other ones of the threads. In one embodiment of method 300, each thread is configured to first process indices in the private range of the index subset assigned to the thread, followed by indices in the public range of the index subset. In one embodiment, each thread is configured to process indices in the public range of the index subset assigned to the thread by moving the boundary point of the index subset toward the end point, and processing indices positioned between an old position of the boundary point and a new position of the boundary point. The boundary point of each index subset according to one embodiment is configured to be moved only by the thread to which the index subset is assigned. In one embodiment, the boundary point is configured to be moved toward the start point to decrease the private range and increase the public range, and is configured to be moved toward the end point to increase the private range and decrease the public range. Each thread according to one embodiment is configured to move the boundary point of the index subset assigned to the thread toward the start point when the end point of the index subset has been moved by another thread to the boundary point. In one embodiment, each thread is configured to move the boundary point of the index subset assigned to the thread toward the start point when the thread detects that it is blocked or about to be blocked, and each thread is configured to decide whether to move the boundary point back toward the end point after the blocking (e.g., when a thread comes back from blocking, it may choose to re-privatize some indices that the thread made public when it detected the start of blocking).

In one embodiment of method 300, each thread is configured to steal indices from the public ranges of index subsets assigned to other threads after the indices in the index subset assigned to the thread have been processed. Each thread according to one embodiment is configured to steal indices from the public range of an index subset assigned to another thread by moving the end point of the index subset toward the boundary point in synchronization with the other threads, and executing indices positioned between a new position of the end point and an old position of the end point.

As described above with respect to FIG. 3, at 302 in method 300, a plurality of index subsets of the integer index range are assigned to a corresponding plurality of threads. FIG. 4 is a diagram illustrating an index subset 400 of an integer index range for parallel loop execution by a thread according to one embodiment. As shown in FIG. 4, index subset 400 includes a start point 402, an end point 412, and a boundary point 406 positioned between the start point 402 and the end point 412. The portion of the index subset 400 between the start point 402 and the boundary point 406 represents a private range 404, and the portion of the index subset 400 between the boundary point 406 and the end point 412 represents a public range 408.

In one embodiment, when a subset of indices, such as index subset 400, is assigned to a thread at 302 in method 300, that index subset 400 is stored by the thread as two portions or ranges—a private range 404 and a public range 408. In one embodiment, the boundary point 406 is in the middle of the index subset 400, and the private range 404 includes the same number of indices as the public range 410. In one embodiment, the private range 404 is a contiguous portion of the overall range being processed by all of the threads, and all of the indices within the private range 404 can safely be executed by the thread to which the subset 400 is assigned without any synchronization with other threads.

All of the threads are capable of moving the end point 412 of a given index subset 400 toward the boundary point 406 (as indicated at 410), and processing indices in the public range 408. Before a thread can execute any indices within the public range 408, the thread will attempt to move the end point toward the boundary point 406 with a synchronized access, such that the new indices that the thread intends to access will now appear outside the public range 408 and inaccessible to other threads. Threads other than the thread to which the index subset 400 is assigned can only modify the end point 412 to lower index values (i.e., to the left in FIG. 4) in one embodiment, which happens when these threads intend to steal work (i.e., indices) from index subset 400. This access pattern helps to maintain data locality for the thread to which the index subset 400 is assigned, which otherwise could sustain damage as a result of a steal action.

The boundary point 406 according to one embodiment can be moved in either direction by the thread to which the index subset 400 is assigned (as indicated at 414), but is not movable by any other threads. The movement of the boundary point 406 can either be to higher index values (i.e., to the right in FIG. 4) in order for the thread to acquire more of the public range 408 for local execution, or to lower index values (i.e., to the left in FIG. 4) in order to expand the public range 408 and allow more indices to be stolen by other threads. In one embodiment, some synchronization between threads is performed for the boundary movements to prevent mistakes in the stealing actions. In one embodiment, each thread is configured to monitor runtime statistics and determine whether to move the boundary point 406 based on the statistics, the remaining number of indices, limits on the expected duration of blocking, as well as other factors. For example, a thread may sense that its private range 404 is about to be finished soon (e.g., by comparing the remaining private range to the average running length of the public ranges), and decide to just finish its private range 404 on its own rather than sharing it with other threads by publicizing some of the private range 404.

One embodiment provides a reduction in synchronization overheads in parallel loop execution by the use of dynamically managed index partitions (i.e., such as index subset 400) that enable index range stealing, and the use of a range splitting algorithm with the detection of thread blocking. One embodiment provides a range partitioning scheme that primarily aims to minimize synchronization costs by starting execution on each thread with large index subset sizes, and deferring synchronization until the need arises, while still maintaining load balancing. In one embodiment, load balancing is achieved by: (1) Allowing threads to steal indices from each other (e.g., from the public range 408 of a given index subset 400); and (2) dynamically splitting an index subset 400 assigned to a thread to allow further stealing of indices. In one embodiment, the dynamic splitting of an index subset 400 can be triggered under two conditions: (1) A thread detects that the "stealable" portion (i.e., the public range 408) of the index subset 400 it owns has been fully stolen by other threads, which provides load balancing through index stealing throughout the entire parallel loop execution; and (2) a thread detects that the loop code that it is executing is about to block, at which point the thread converts part of its "non-stealable" range (i.e., the private range 404) to a "stealable" range (i.e., the public range 408) so that these indices are available for execution by other threads while the original owner thread is in a blocked state.

The parallel loop execution in method 300 according to one embodiment is initiated with an outer function call, such as a loop helper in the Thread Parallel Library (TPL) of the MICROSOFT™.NET framework, as shown in the following Pseudo Code Example I:

PSEUDO CODE EXAMPLE I

Parallel.For(nRangeStart, nRangeEnd, i=>{LoopBody(i);});

In Example I, "nRangeStart" corresponds to the beginning index of the overall integer index range in method 300, "nRangeEnd" corresponds to the ending index of the overall integer index range, and "LoopBody" corresponds to the loop code executed at 306 in method 300. The pseudo code in Example I spawns a number of tasks, each executing on a separate thread, that follow a loop to find more work (index ranges) and execute them in their local sequential loop. The loop for finding more work according to one embodiment is given in the following Pseudo Code Example II:

PSEUDO CODE EXAMPLE II

```
while( FindWork( ref int nFrom, ref int nTo ) )
{
    for( int i=nFrom; int<nTo;i++)
    {
        LoopBody(i);
        RepartitionIfNotified(ref nTo);
    }
}
```

The FindWork( ) and RepartitionIfNotified( ) pseudo-calls in Example II represent the communication of an individual thread with a helper class that orchestrates the execution of the entire loop range and the synchronization of worker threads, both of which are explained in further detail below. In Example II, for each index value, i, in the range between nFrom and nTo, the LoopBody( ) and RepartitionIfNotified( ) calls are made. The LoopBody( ) functions represents the loop code provided by a user that is to be executed during each iteration of the For loop.

The FindWork( ) call given in Pseudo Code Example II attempts to find a new index range for a thread to execute. The following Pseudo Code Example III provides one embodiment of pseudo code for implementing the FindWork( ) method:

PSEUDO CODE EXAMPLE III

```
bool FindWork( ref int nFrom, ref int nTo )
{
    if( GrabOuterPartition( ref nFrom, ref nTo ) ) return true;
    if( AcquireFromPublicRange( ref nFrom, ref nTo ) ) return true;
    if( StealRange( ref nFrom, ref nTo ) ) return true;
    return false;
}
```

Typically, a thread begins its life without any public or private ranges, and the first work it receives will be from the GrabOuterPartition( ) function in Example III. An outer partition is one of the initial large sized partitions (i.e., one of the index subsets 400 assigned at 302 in method 300), which are created in one embodiment with the expectation to defer synchronization until later. The outer partitions (index subsets 400) are the divisions of the entire loop range (defined by nRangeStart and nRangeEnd in Pseudo Code Example I) by the number of worker threads.

The AcquireFromPublicRange( ) function in Example III occurs when a thread is done executing its private range 404, and moves on to subsequent indices in its public range 408. Since the public range 408 can be accessed by foreign threads, this update happens with synchronization (e.g., an interlocked compare and swap operation) in one embodiment. Every time a thread advances into its public range 408 according to one embodiment, the thread does so by taking a pre-determined fraction (e.g., half) of the public range 408, rather than a fixed count of indices, which results in the cost of the synchronization being of a logarithmic order. In one embodiment, the pre-determined fraction is adjusted on the fly based on current processing conditions (e.g., workload, blocking, etc.). In one embodiment, a thread advances into its public range 408 by moving the boundary point 406 into the middle of the public range 408, thereby converting half of the public range 408 into the private range 404.

The StealRange( ) function in Example III occurs when a thread finds that there are no more indices remaining in its private range 404 and its public range 408. In this case, the thread traverses the public ranges belonging to other threads and attempts to steal an index range by moving the end point 412 of that index subset 400 to a lower value. The amount of movement of the end point according to one embodiment is a pre-determined fraction (e.g., half) of the available length of the public range 408, which achieves logarithmic synchronization costs.

In one embodiment, a thread will split its private range 404 to make more iteration indices available to other threads under two conditions: (1) Whenever the thread observes that other threads have moved the end point 412 of its public range 408 low enough to reach the boundary point 406; or (2) whenever blocking is detected in the loop code that the thread is executing. The first condition is detected by the RepartitionIfNotified( ) pseudo-call within the local loop as shown in Pseudo Code Example II. Whenever the first condition is detected, the RepartitionIfNotified( ) function call performs the update to the boundary point 406 in a thread-safe manner, and returns to the local loop a new value for the last iteration of the local loop since this will have been modified by the split action.

For detection of the second condition (blocking) listed above, the task scheduling/execution environment provide a mechanism for intercepting thread blocking calls made by the loop code. Such a mechanism exists for the MICROSOFT™.Net framework, which the Thread Parallel Library (TPL) is built into. In one embodiment, this mechanism is implemented in the form of a callback delegate that gets registered individually for each of the tasks/threads that work on the parallel loop. The following Pseudo Code Example IV gives pseudo code for implementing range splitting based on blocking detection according to one embodiment:

PSEUDO CODE EXAMPLE IV

```
PreBlockCallback(...)
{
    SplitPrivateRange( );
}
PostBlockCallback(...)
{
    ClaimBackPublicRange( );
    UpdateLocalIndices( );
}
```

During the PreBlockCallback( ), blocking of the thread is detected and the SplitPrivateRange( ) function is called, which causes the boundary point 406 to be moved, for example, into the middle of the private range 404, thereby converting half of the private range 404 into the public range 408. In one embodiment, the SplitPrivateRange( ) action is optional, and may or may not be performed.

During the PostBlockCallback( ), it is detected that the thread is no longer blocked, and if other threads have not claimed the indices that were made public during PreBlock-Callback( ), the thread will claims those indices back (i.e., move the boundary 406 to the right to convert these indices back into the private range 404) via the ClaimBackPublicRange( ) and the UpdateLocalIndices( ) calls.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of executing a loop over an integer index range of indices in a parallel manner, comprising:
    assigning a plurality of index subsets of the integer index range to a corresponding plurality of threads;
    defining for each index subset a start point of the index subset, an end point of the index subset, and a boundary point of the index subset positioned between the start point and the end point of the index subset, a portion of the index subset between the start point and the boundary point represents a private range and the portion of the subset between the boundary point and the end point represents a public range, each private range being executable by the thread to which it is assigned without synchronization with other threads of the plurality of threads and each public range being accessible by the plurality of threads; and
    executing loop code with each thread based on the index subset of the integer index range assigned to the thread.

2. The method of claim 1, wherein the public range of an index subset assigned to a thread represents a range of indices that are configured to be processed by any one of the threads based on synchronization with other ones of the threads.

3. The method of claim 1, wherein each thread is configured to first process indices in the private range of the index subset assigned to the thread, followed by indices in the public range of the index subset.

4. The method of claim 3, wherein each thread is configured to process indices in the public range of the index subset assigned to the thread by moving the boundary point of the index subset toward the end point, and processing indices positioned between an old position of the boundary point and a new position of the boundary point.

5. The method of claim 1, wherein the boundary point of each index subset is configured to be moved only by the thread to which the index subset is assigned.

6. The method of claim 5, wherein the boundary point is configured to be moved toward the start point to decrease the private range and increase the public range, and is configured to be moved toward the end point to increase the private range and decrease the public range.

7. The method of claim 6, wherein each thread is configured to move the boundary point of the index subset assigned to the thread toward the start point when the end point of the index subset has been moved by another thread to the boundary point.

8. The method of claim 6, wherein each thread is configured to move the boundary point of the index subset assigned to the thread toward the start point when the thread detects that it is blocked or about to be blocked, and wherein each thread is configured to decide whether to move the boundary point back toward the end point after the blocking.

9. The method of claim 1, wherein each thread is configured to steal indices from the public ranges of index subsets assigned to other threads after the indices in the index subset assigned to the thread have been processed.

10. The method of claim 9, wherein each thread is configured to steal indices from the public range of an index subset assigned to another thread by moving the end point of the index subset toward the boundary point in synchronization with the other threads, and executing indices positioned between a new position of the end point and an old position of the end point.

11. A computer-readable storage device comprising:
    a memory device configured for storing computer-executable instructions configured to execute a loop over an integer index range of indices in a parallel manner, the computer-executable instructions comprising:
        first instructions that assign a plurality of index subsets of the integer index range to a corresponding plurality of threads;
        second instructions that define for each index subset a start point of the index subset, an end point of the index subset, and a boundary point of the index subset positioned between the start point and the end point of the index subset, a portion of the index subset between the start point and the boundary point represents a private range and the portion of the index subset between the boundary point and the end point represents a public range, each private range being executable by the thread to which it is assigned without synchronization with other threads of the plurality of threads and each public range being accessible by the plurality of threads; and
        loop code instructions that execute with each thread based on the index subset of the integer index range assigned to the thread.

12. The computer-readable storage device of claim 11, wherein the public range of an index subset assigned to a thread represents a range of indices that are configured to be processed by any one of the threads based on synchronization with other ones of the threads.

13. The computer-readable storage device of claim 11, wherein each thread is configured to first process indices in the private range of the index subset assigned to the thread, followed by indices in the public range of the index subset.

14. The computer-readable storage device of claim 13, wherein each thread is configured to process indices in the public range of the index subset assigned to the thread by moving the boundary point of the index subset toward the end point, and processing indices positioned between an old position of the boundary point and a new position of the boundary point.

15. The computer-readable storage device of claim 11, wherein the boundary point of each index subset is configured to be moved only by the thread to which the index subset is assigned.

16. The computer-readable storage device of claim 15, wherein the boundary point is configured to be moved toward the start point to decrease the private range and increase the public range, and is configured to be moved toward the end point to increase the private range and decrease the public range.

17. The computer-readable storage device of claim 16, wherein each thread is configured to move the boundary point of the index subset assigned to the thread toward the start point when the end point of the index subset has been moved by another thread to the boundary point.

18. The computer-readable storage device of claim 16, wherein each thread is configured to move the boundary point of the index subset assigned to the thread toward the start point when the thread detects that it is blocked or about to be blocked, and wherein each thread is configured to decide whether to move the boundary point back toward the end point after the blocking.

19. A method of executing a loop over an integer index range of indices in a parallel manner, comprising:

assigning a plurality of index subsets of the integer index range to a corresponding plurality of threads;

defining for each index subset a start point of the index subset, an end point of the index subset, and a boundary point of the index subset positioned between the start point and the end point of the index subset, a portion of the index subset between the start point and the boundary point represents a private range and the portion of the index subset between the boundary point and the end point represents a public range, each thread being configured to steal indices from the public ranges of index subsets assigned to other threads after the indices in the index subset assigned to the thread have been processed; and executing loop code with each thread based on the index subset of the integer index range assigned to the thread.

20. The method of claim 19, wherein each thread is configured to steal indices from the public range of an index subset assigned to another thread by moving the end point of the index subset toward the boundary point in synchronization with the other threads, and executing indices positioned between a new position of the end point and an old position of the end point.

* * * * *